United States Patent
Eide

(10) Patent No.: US 9,843,101 B2
(45) Date of Patent: Dec. 12, 2017

(54) ANTENNA SYSTEM FOR GROUND PENETRATING RADAR

(71) Applicant: 3D-RADAR AS, Trondheim (NO)

(72) Inventor: Egil Eide, Tiller (NO)

(73) Assignee: 3D-RADAR AS, Trondheim (NO)

( * ) Notice: Subject to any disclaimer, the term of this patent is extended or adjusted under 35 U.S.C. 154(b) by 0 days.

(21) Appl. No.: 15/115,499

(22) PCT Filed: Jan. 9, 2015

(86) PCT No.: PCT/NO2015/050004
§ 371 (c)(1),
(2) Date: Jul. 29, 2016

(87) PCT Pub. No.: WO2015/115906
PCT Pub. Date: Aug. 6, 2015

(65) Prior Publication Data
US 2017/0179611 A1    Jun. 22, 2017

(30) Foreign Application Priority Data
Jan. 30, 2014   (NO) .................................. 20140109

(51) Int. Cl.
*H01Q 17/00*     (2006.01)
*G01S 13/88*     (2006.01)
(Continued)

(52) U.S. Cl.
CPC ......... *H01Q 17/001* (2013.01); *G01S 13/885* (2013.01); *H01Q 1/38* (2013.01);
(Continued)

(58) Field of Classification Search
CPC .......... H01Q 17/001; H01Q 1/38; H01Q 1/48; H01Q 9/30
(Continued)

(56) References Cited

U.S. PATENT DOCUMENTS 6,670,906 B1    12/2003   Roberts et al.
7,170,449 B2    1/2007    Eide
(Continued)

FOREIGN PATENT DOCUMENTS

CN    102185176 A    9/2011
EP    0500380 A1     8/1992
(Continued)

OTHER PUBLICATIONS

Eide, E., "Ultra-wideband transmit/receive antenna pair for ground penetrating radar," IEE Proceedings—Microw. Antennas Propag., vol. 147, No. 3, pp. 231-235 (Jun. 3, 2000).
(Continued)

*Primary Examiner* — Huedung Mancuso
(74) *Attorney, Agent, or Firm* — Rothwell, Figg, Ernst & Manbeck, P.C.

(57) ABSTRACT

Antenna system for a georadar, comprising two plate like antenna devices, where said two antenna devices comprise at least one sender antenna (1) and at least one receiver antenna (2), respectively, as the antennas (1,2) in each antenna device comprise monopoles formed by applying to metal surfaces an electrically insulating plate base (3) located on the underside of a layer of radar absorbing material (4), where the top side of the material layer is covered by a metallic ground plane (5). The antenna device is also arranged to lay against the ground (10). A layer of radar absorbent material (4) is arranged on the top side of the ground planes (5), and the ground planes (5) are not connected electrically to each other.

13 Claims, 4 Drawing Sheets

Figure 1:
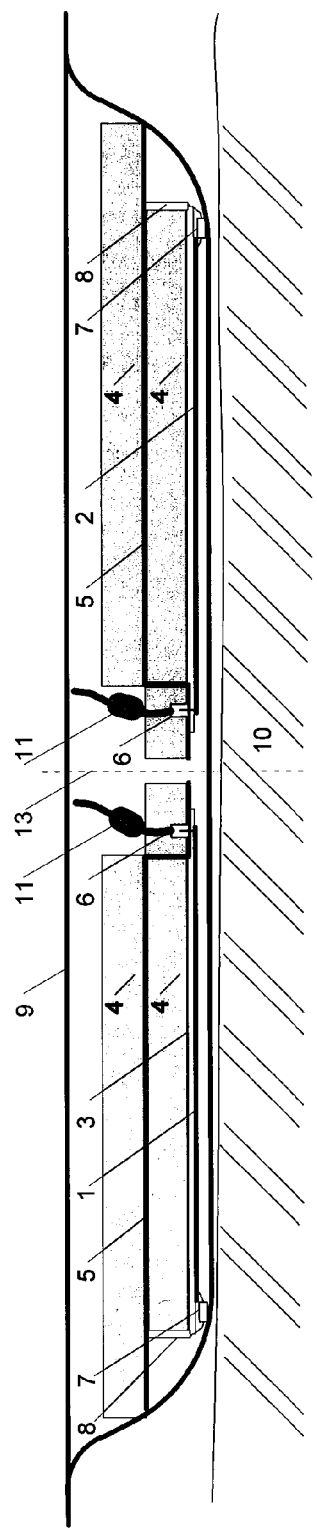

(51) Int. Cl.
*H01Q 9/30* (2006.01)
*H01Q 1/38* (2006.01)
*H01Q 1/48* (2006.01)
*G01V 3/12* (2006.01)

(52) U.S. Cl.
CPC .............. *H01Q 1/48* (2013.01); *H01Q 9/30* (2013.01); *G01V 3/12* (2013.01)

(58) Field of Classification Search
USPC ........................................................ 343/848
See application file for complete search history.

(56) References Cited

U.S. PATENT DOCUMENTS

| | | | |
|---|---|---|---|
| 8,102,327 B2* | 1/2012 | Johnson | H01Q 1/38 343/700 MS |
| 8,531,344 B2* | 9/2013 | Ayatollahi | H01Q 9/28 343/793 |
| 8,717,250 B2* | 5/2014 | Nilsson | H01Q 9/28 343/893 |
| 9,478,868 B2* | 10/2016 | Henry | H01Q 1/38 |
| 2005/0110687 A1 | 5/2005 | Starkie et al. | |
| 2006/0012525 A1 | 1/2006 | Eide | |
| 2007/0159400 A1 | 7/2007 | Dejean | |
| 2007/0200762 A1 | 8/2007 | Frank et al. | |
| 2009/0195459 A1 | 8/2009 | Chua | |
| 2011/0102729 A1 | 7/2011 | Van Gils | |
| 2011/0169707 A1 | 7/2011 | Van Gils | |
| 2012/0229358 A1* | 9/2012 | Doneker | H01Q 1/526 343/848 |
| 2014/0240196 A1 | 8/2014 | Eide et al. | |
| 2014/0306846 A1 | 10/2014 | Nakatsu | |

FOREIGN PATENT DOCUMENTS

| | | |
|---|---|---|
| EP | 1542314 A1 | 6/2005 |
| EP | 1558946 A1 | 8/2005 |
| EP | 1786064 | 5/2007 |
| JP | H08105962 A | 4/1996 |
| JP | 2007201868 A | 8/2007 |
| WO | WO 0161784 A1 | 8/2001 |
| WO | WO 2004042427 A1 | 5/2004 |
| WO | WO 2010151125 A1 | 12/2010 |
| WO | WO 2013051945 A1 | 4/2013 |

OTHER PUBLICATIONS

International Search Report issued in PCT/N02015/050004, 4 pages (dated Mar. 23, 2015).
Written Opinion issued in PCT/NO2015/050004, 4 pages (dated Mar. 23, 2015).
Search Report issued in Norwegian Patent Application No. 20140109, 2 pages (dated Aug. 27, 2014).
Office Action issued in Norwegian Patent Application No. 20140109, 4 pages (dated Aug. 27, 2014).
English translation of Notification of Reasons for Rejection issued in Japanese Patent Application No. 2014-534509, 2 pages (dated May 12, 2015).
Examination Report issued in Australian Patent Application No. 2012319274, 2 pages (dated Jan. 11, 2016).
Extended European Search issued in European Patent Application No. 12838565.5, 6 pages (dated Nov. 12, 2015).
Hertl, I., et al., UWB Antennas for Ground Penetrating Radar Application, Applied Electromagnetics and Communications, ICECOM, 19th International Conference, IEEE, Piscataway, NJ, USA (Sep. 24, 2007).
International Preliminary Report on Patentability issued in International Patent Application No. PCT/NO2012/050193, 5 pages (dated Apr. 8, 2014).
International Search Report and Written Opinion issued in International Patent Application No. PCT/NO2012/050193, 7 pages (dated Dec. 14, 2012).
Notice of Acceptance issued in Australian Patent Application No. 2012319274, 2 pages (dated May 4, 2016).
Notice of Allowance (and English translation) issued in Japanese Patent Application No. 2014-534509, 2 pages (dated Apr. 12, 2016).
Notice of Allowance issued in U.S. Appl. No. 14/349,373, 22 pages (dated Dec. 9, 2015).
Notice of Allowance issued in U.S. Appl. No. 14/349,373, 16 pages (dated Mar. 2, 2016).
Notice of Allowance issued in U.S. Appl. No. 14/349,373, 15 pages (dated Jun. 29, 2016).
Notice of Grant (and English translation) issued in Chinese Patent Application No. 201280045740.6, 3 pages (dated Feb. 4, 2016).
Office Action (and English translation) issued in Chinese Patent Application No. 201280045740.6, 4 pages (dated Aug. 4, 2015).
Office Action with Search Report (and English translation) issued in Chinese Patent Application No. 201280045740.6, 10 pages (dated Dec. 31, 2014).

* cited by examiner

ANTENNA SYSTEM FOR GROUND PENETRATING RADAR

CROSS-REFERENCE TO RELATED APPLICATION

This application is a 35 U.S.C. 371 National Phase Entry Application from PCT/NO2015/050004, filed Jan. 9, 2015, which claims the benefit under 35 U.S.C. §119(a) of the filing date of Norwegian patent application No. 20140109, filed Jan. 30, 2014, the respective disclosure(s) which is(are) incorporated herein by reference.

TECHNICAL FIELD OF THE INVENTION

The present invention comprises an antenna system for a georadar, where the sent electromagnetic waves primarily radiate down into the ground.

THE STATE OF THE ART

A georadar is a type of radar which sends electromagnetic waves (radio waves) down into the ground and measure the reflections from objects or stratifications in the underground. The antenna for this type of radar should ensure that the sent signal penetrates down into the ground in the best possible manner. Therefore the antenna should be placed on or close to the ground. In order to achieve sufficient insulation between the sender and receiver of the georadar, separate sender and receiving antennas which are mounted side by side are usually employed.

So-called "bowtie" antennas have been used in several applications where a broad bandwidth is needed. The most definitive article regarding such antennas was published by G. H. Brown and O. M. Woodward in RCA Review, pp 425-452, in December 1952. Since then many articles regarding variants of this type of antenna has been published. For georadars it has been common to use bowtie dipoles but these require so-called balun (balanced-to-unbalanced) transformers in order to operate in a satisfactory manner. In year 2000 E. S. Eide published an article in IEE Transactions on Microwave, Antennas and Propagation, Vol. 147, No. 3, describing a new antenna system comprising a pair of bowtie monopoles mounted on the underside of a V-shaped ground plane. Since the antenna system was comprised of monopoles instead of dipoles, there was no dependency on balunes for the antenna. The shape of the ground plane does however require the use of relatively much radar absorbing material (absorbent) in order to fill the space between the ground plane and the antenna elements. A development of the antenna is patented as Norwegian Patent NO. 316,658, European Patent No. 1,558,946, and U.S. Pat. No. 7,170,449. Here the sender and receiver antennas are mounted on a common ground plane that is connected by a hinge that makes it possible to adjust the angle α between the antennas to an optimal value. The disadvantage of this construction is that part of the radar signal sent from the sender antenna is reflected by the receiver antenna located right opposite the sender antenna before it enters the ground. Thus an undesired double pulse is created, degrading the radars ability to discriminate between objects close to each other. In addition, the radar waves reflected upwards from the ground itself will be reflected once more in the antenna construction, which due to the connected ground planes comprises a so called-corner reflector. The reflected signals will enter the ground again and give rise to so-called multiple signals that contribute to deteriorate the radar picture. A third disadvantage of this construction is that it gives a powerful direct wave from the sender to receiver antennas, because these antennas are right opposite each other.

A further developed version of the antenna is described by patent application WO 2013/051945A1 where the antenna devices are arranged to form a V-shaped wedge with the point directed down towards the ground, and the connections points for the coaxial cable to the sender and receiver (feed points) is located the furthest away from the point of the V-shaped wedge. In addition the ground planes are not electrically connected to each other. This antenna construction resulted in a substantially improved signal quality compared to the construction of Norwegian Patent no. 316,658.

A common feature for the so far described constructions is that they are not lying down towards the ground, and thus may connect the energy directly down into the ground. The disadvantage of this is that the radio waves suffer a substantial loss in the transition from air to ground due to the reflection which arises at this boundary interface. In addition the waves will be subject to reflection (bending) due to the difference in wave speed in respect to air and ground. This makes subsequent picture focusing more difficult where so called seismic migration techniques are used in the data processing.

SHORT DESCRIPTION OF THE INVENTION

The antenna has now been further developed to a new antenna system in accordance with the present invention, which is a novel and improved solution to the above mentioned.

It is an aim of the present invention to generate an antenna that gives a radio signal with better connection for the energy down into the ground than the prior antenna system. In addition it is an aim to reduce the multiple reflections from the antenna construction in order for the radar signal to have less ringing. The present invention result in substantially less ringing and an increased penetration depth of the radar signals down into the ground, and this makes detection of deeper objects in the underground possible. The antenna is constructed to lay against the ground, and this reduces the signal path from air to ground. This results in radar data that is better suited to data analysis through so called seismic migration techniques.

The characteristic features of the antenna system in accordance with the present invention are shown in independent claim 1. Additional features are given by the independent claims.

A first embodiment of the present invention is an antenna system for a georadar, comprising two plate like antenna devices, where the antenna devices comprise at least one sender antenna and at least one receiver antenna, respectively. The antennas in each antenna device comprise monopoles constructed by applying to metal surfaces an electrically insulating plate base arranged on the underside of a layer of radio absorbent material. The top side of the material layer is covered by a metallic ground plane. The antenna devices are arranged to lay down against the ground. A layer of radio absorbent material is arranged on the top side of the ground planes, and the ground planes are not electrically connected.

The radio absorbent material on the top side of the ground plane may advantageously cover the area right by the cable connectors located in the feed point of the antennas.

The antenna devices for the sender antennas and receiver antennas may advantageously together comprise a flat structure, where the antenna devices are oriented in such a manner that the antennas feed point is close next to the symmetry axis of the antenna.

The antennas may mainly be V-shaped, while the radar absorbent material may comprise of one or more resistant layers.

The termination point of the antennas may be connected to the ground plane through resistors and spacers. The plate base may be a laminate, especially a circuit board laminate, preferably comprising a glass fiber substrate.

Coaxial cables connecting the feed point of the sender and receiver antennas with the radar sender and radar receiver, respectively, may have mounted thereupon a sleeve of ferrite material on the outside of the screen of the coaxial cable.

The antenna system, which comprises one or more sender antennas and a group of receiver antennas, may comprise of two or more receiver antennas forming a linear row of antennas distributed along the symmetry axis between the two antenna devices.

The antenna system may comprise two groups of receiving antennas, each comprising of one or more receiving antennas, of which one of the groups forms an extra row of receiving antennas located on opposite sides of the row of ordinary receiving antennas.

The number of receiving antennas in each group may be more that the number of sender antennas, and each sender antenna may be arranged staggered by half the distance of an antenna along the symmetry axis in accordance with the receiving antennas.

SHORT DESCRIPTION OF THE FIGURES

The present invention will now be explained with reference to the accompanying figures, where:

FIG. 1 discloses a cross sectional view of the antenna system on FIG. 1 seen from the side.

Figure 2:
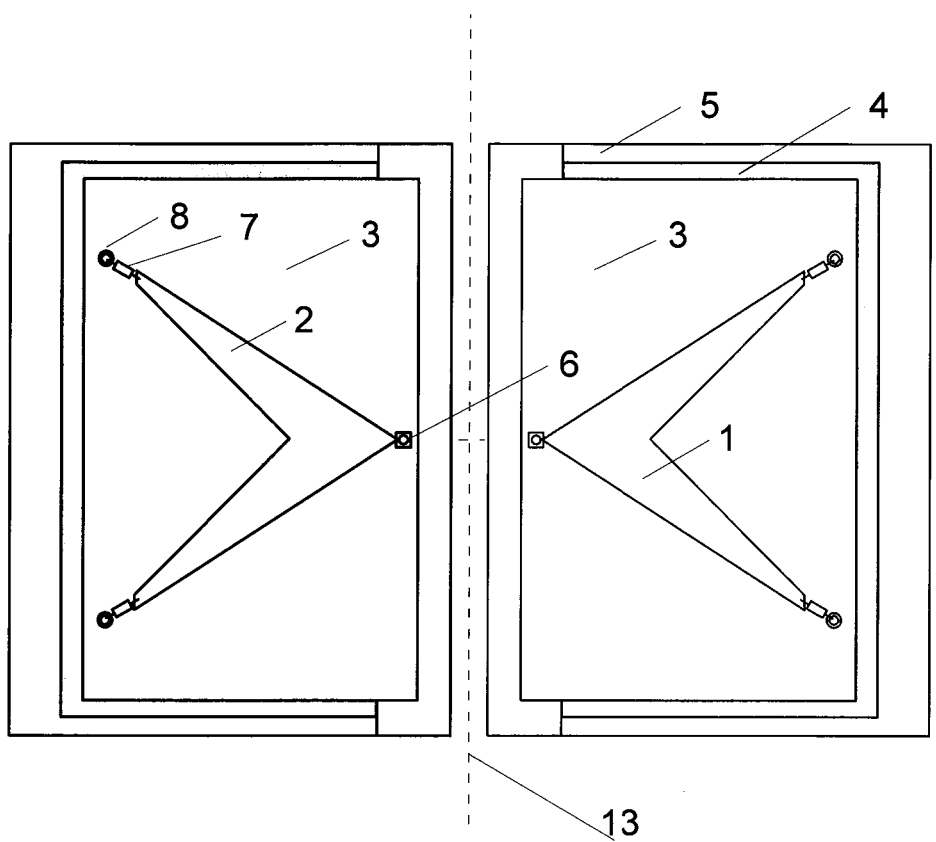

FIG. 2 discloses an embodiment of the antenna system in accordance with the present invention viewed from the underside.

Figure 3:
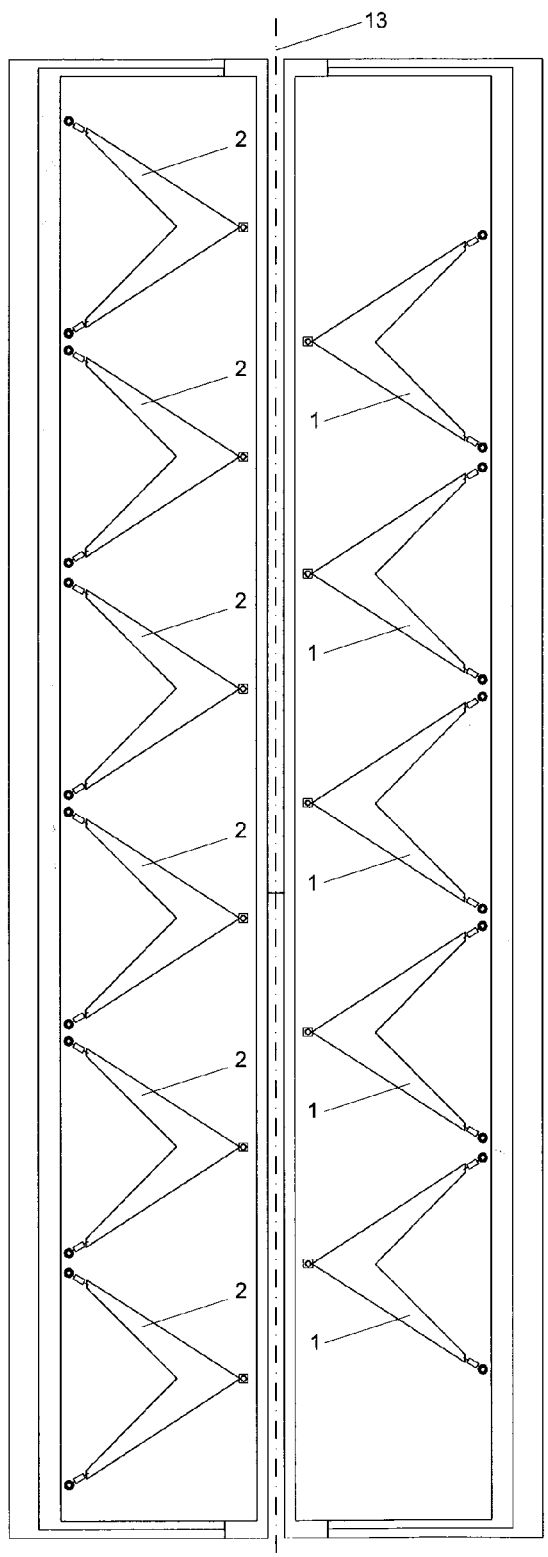

FIG. 3 discloses an embodiment of the antenna system in accordance with the present invention, viewed from the underside, where several sender antennas and several receiving antennas are distributed along the symmetry axis of the antenna system.

Figure 4:
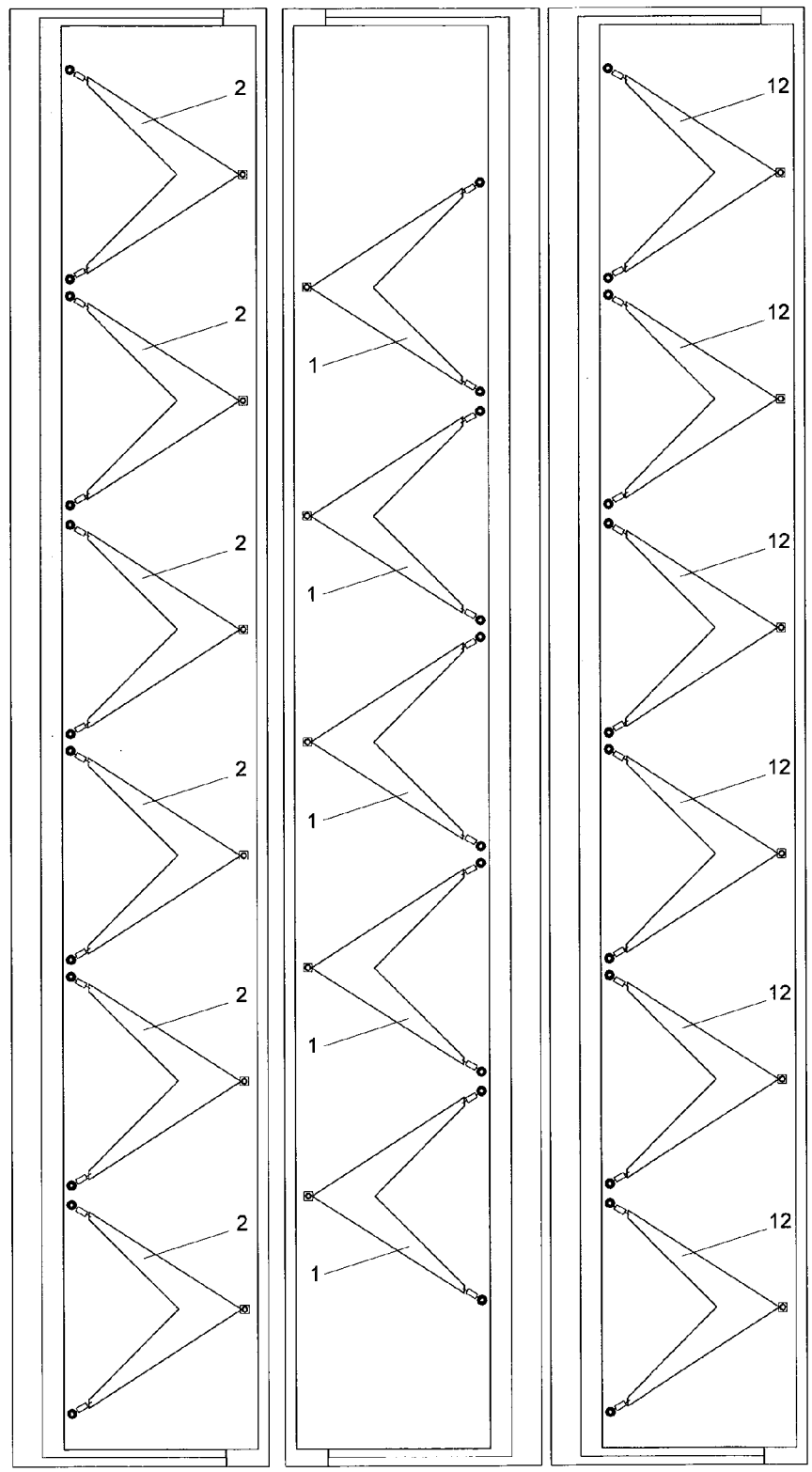

FIG. 4 discloses an embodiment of the antenna system in accordance with the present invention, viewed from the underside, where an extra row of receiving antennas has been added placed on the opposite side of the row of sender antennas.

DETAILED DESCRIPTION OF THE EMBODIMENTS OF THE PRESENT INVENTION

FIG. 1 discloses an antenna system comprising two antenna devices for sending and receiving, respectively as described hereafter. The sending and receiving antennas (1,2) comprises monopoles constructed from an electrically conductive material on an electrically insulating plate base (3), which may for example be a 1.55 mm thick circuit card laminate of the type FR-4. The monopoles may for example be triangular shaped or V-shaped for optimal impedance adaption to the feed point (6). The circuit card laminates (3) are placed on the underside of the plate shaped layers of material (4) which dampens the radio waves (radio absorbing material). This may either be a material consisting of thin resistive layers, or it may be a radar absorbent. The absorbent layers are placed on a ground plane (5) located behind and consisting of metal. The antennas (1,2) for sending and receiving are constructed in the same manner. Each of the antennas are fed by means of a coaxial cable through a cable connector placed at the feed point (6) where the center line of the coaxial cable is connected to the antenna (1,2) and the screen is connected to the ground plane (5). The outer edges of the antennas, that in the following are termed termination points, are connected to the ground plane by resistors (7), for example of 50 ohm, connected to for example metallic spacers (8) mounted on the ground plane (5). The spacers (8) contribute mechanical attachment of the circuit card laminates (3) to the ground plane (5). The two parts of the ground plane are in this example mounted inside of a glass fiber structure (9) that ensures that they are not electrically connected to each other. The antenna device is arranged in such a manner that the antenna panels may lay flat against the ground (10). It is an essential feature of the present invention that the ground planes are also covered by absorbent material (4) on the top side in order to suppress undesired electrical currents on the top side of the ground plane (5) that may result in radiation above the ground. It is especially important that the ground plane in the area right by the connectors for the feed point (6) is covered by absorbent material (4) in order to avoid so called ringing (multiple reflections) from signals leaking to the top side of the ground plane (5). As a matter of form we mention that the expressions top and bottom side relates to the side of the antenna system that faces away from the ground and the side that faces the ground when the system, respectively, is arranged for normal use in relation to the ground in the way it is illustrated in for example FIG. 1.

Another feature of the invention is that all coaxial cables connecting the feed point (6) of the antennas with respectively the radar sender and radar receiver has mounted thereupon a sleeve of ferrite (11) on the outside of the screen of the coaxial cable in order to avoid high frequency currents following the outside of the screen to the cable and thus cause undesired radiation. Another consequence of the ferrites is that the electrical screen of the coaxial cable at high frequencies will not form an effective electrical connection between the ground planes (5) for the sender antenna (1) and receiver antenna (2).

FIG. 2 discloses an embodiment of the antenna system from the underside where the sender and receiver antennas (1,2) are V-shaped with resistors (7) connected to metallic spacers (8) to the ground plane (5), where said spacers (8) are placed at the termination points located the furthest away from the feed point (6).

Another embodiment of the antenna system according to the present invention is disclosed by FIG. 3. This figure shows a linear antenna system comprising several sender antennas (1) and several receiver antennas (2) distributed along the symmetry axis (13) of the antenna system.

Another embodiment of the antenna system in accordance with the present invention is disclosed by FIG. 4. On this figure there has been added an extra row of receiver antennas (12) located on the opposite side of the row of sender antennas. (1). This arrangement makes it possible to receive signals from the sender antenna (1) on two rows of receiver antennas (2,12) where the distance between the feed points (6) of the antennas (the offset distances) have different values. A so called multi offset arrangement enables estimation of the wave speed of the radio waves in the ground as well as that at a different offset distance, and thus a different incident angle, it is advantageous in order to accentuate different objects and stratifications in the ground.

The invention claimed is:

1. Antenna system for a georadar, comprising:
   two plate like antenna devices, wherein said two antenna devices comprise at least one sender antenna (1) and at least one receiver antenna (2), wherein said sender and receiver antennas (1,2) in each antenna device comprise monopoles formed by applying to metal surfaces an electrically insulating plate base (3) located on an underside of a layer of radar absorbent material (4), wherein a top side of said material layers is covered by a metallic ground plane (5), and wherein
   said antenna devices are arranged to lay down towards the ground (10), and a layer of radar absorbent material (4) is arranged on a top side of the metallic ground planes (5), wherein said ground planes (5) are not connected electrically to each other.

2. Antenna system in accordance with claim 1, wherein said radar absorbent material (4) on the top side of the ground plane (5) covers an area adjacent to cable connectors localized at a feed point (6) of the antennas.

3. Antenna system in accordance with claim 2, wherein said antenna devices for sender antennas and receiver antennas combined constitute a flat structure where the antenna devices are oriented in order for the feed point (6) of the sender and receiver antennas to lay close against a symmetry axis (13) of the antenna system.

4. Antenna system in accordance with claim 1, wherein the sender and receiver antennas (1,2) are mainly V-shaped.

5. Antenna system in accordance with claim 1, wherein the radar absorbent material (4) consists of one or more resistant layers.

6. Antenna system in accordance with claim 1, wherein termination points of the antennas are connected to the metallic ground plane (5) through resistors (7) and spacers (8).

7. Antenna system in accordance with claim 1, wherein the electrically insulating plate base (3) comprises a laminate.

8. Antenna system in accordance with claim 2, wherein coaxial cables connecting the sender and receiver antennas feed point (6) with a radar sender and a radar receiver, respectively, have mounted thereupon a sleeve of ferrite material (11) on an outer side of a screen of each coaxial cable.

9. Antenna system in accordance with claim 3, comprising one or more sender antennas (1) and a group of receiver antennas (2), consisting of two or more receiver antennas (2) forming a linear row of antennas distributed along the symmetry axis (13).

10. Antenna system in accordance with claim 1, comprising one or more sender antennas (1) and two groups of receiver antennas (2,12) each consisting of one or more receiver antennas (2,12), where one of said groups forms an extra row of receiver antennas (12) located on the opposite side of the row of the other receiver antennas (2).

11. Antenna system in accordance with claim 8, wherein the number of receiver antennas (2) in each group is one more than the number of sender antennas (1), and wherein each sender antenna (1) is arranged staggered by a distance of half of an antenna along the symmetry axis (13) in relation to the receiver antennas (2).

12. Antenna system in accordance with claim 7, wherein the electrically insulating plate base (3) comprises a circuit board laminate.

13. Antenna system in accordance with claim 12, wherein the electrically insulating plate base (3) comprises a glass fiber substrate.

* * * * *